United States Patent [19]

Abelitis et al.

[11] Patent Number: 4,470,849
[45] Date of Patent: Sep. 11, 1984

[54] METHOD AND DEVICE FOR THE CALCINATION OF FINELY GRAINED TO DUST-FORM MATERIAL, PARTICULARLY OF COMMINUTED RAW MATERIAL TO BE USED IN THE MANUFACTURE OF CEMENT

[75] Inventors: Andris Abelitis, Rösrath; Kunibert Brachthäuser, Bergisch Gladbach, both of Fed. Rep. of Germany

[73] Assignee: Klockner-Humboldt-Deutz AG, Fed. Rep. of Germany

[21] Appl. No.: 508,500

[22] Filed: Jun. 27, 1983

Related U.S. Application Data

[63] Continuation of Ser. No. 234,422, Feb. 13, 1981, abandoned, which is a continuation of Ser. No. 115,251, Jan. 25, 1980, abandoned, which is a continuation of Ser. No. 911,698, Jun. 1, 1978, abandoned.

[30] Foreign Application Priority Data

Jun. 1, 1977 [DE] Fed. Rep. of Germany ....... 2724654

[51] Int. Cl.$^3$ ............................................... C04B 7/44
[52] U.S. Cl. ...................................... 106/100; 432/14; 432/16; 432/18; 432/44; 432/58; 432/94; 432/106
[58] Field of Search .................... 106/100; 432/14, 16, 432/18, 44, 58, 94, 106

[56] References Cited

U.S. PATENT DOCUMENTS

| | | | |
|---|---|---|---|
| 3,932,117 | 1/1976 | Ritzmann | 432/106 |
| 4,039,277 | 8/1977 | Kobayashi | 432/14 |
| 4,045,162 | 8/1977 | Christiansen | 432/14 |
| 4,060,375 | 10/1978 | Weber | 432/106 |
| 4,088,438 | 5/1978 | Deussner | 432/106 |
| 4,118,177 | 10/1978 | Weber | 432/58 |
| 4,187,071 | 2/1980 | Brachthauser | 432/106 |
| 4,249,892 | 2/1981 | Brachthauser | 106/100 |

FOREIGN PATENT DOCUMENTS 1437704 6/1976 United Kingdom ................ 432/58

*Primary Examiner*—James Poer
*Attorney, Agent, or Firm*—Hill, Van Santen, Steadman & Simpson

[57] ABSTRACT

A method and mechanism for heat treating a pulverulent comminuted raw material in the process of making cement including preheating the material, passing the material through a first reaction zone, supplying a first fuel supply to the first zone for supplying thermal energy for carrying out the calcination reaction, separating the material from the hot gases received from the first reaction zone and delivering the material to a second reaction zone to which is supplied a second fuel supply for supplying thermal energy for the calcination reaction in the second zone and separating the material from the hot gases from the second zone and delivering the material to a sintering kiln and then passing it to a cooler with the air from the cooler supplied to support combustion in the first zone, and with the arrangement preferably arranged in two parallel flows with each flow path containing the preheater, and the reaction zones and separators with the material flows combining just as they enter the sintering zone.

16 Claims, 1 Drawing Figure

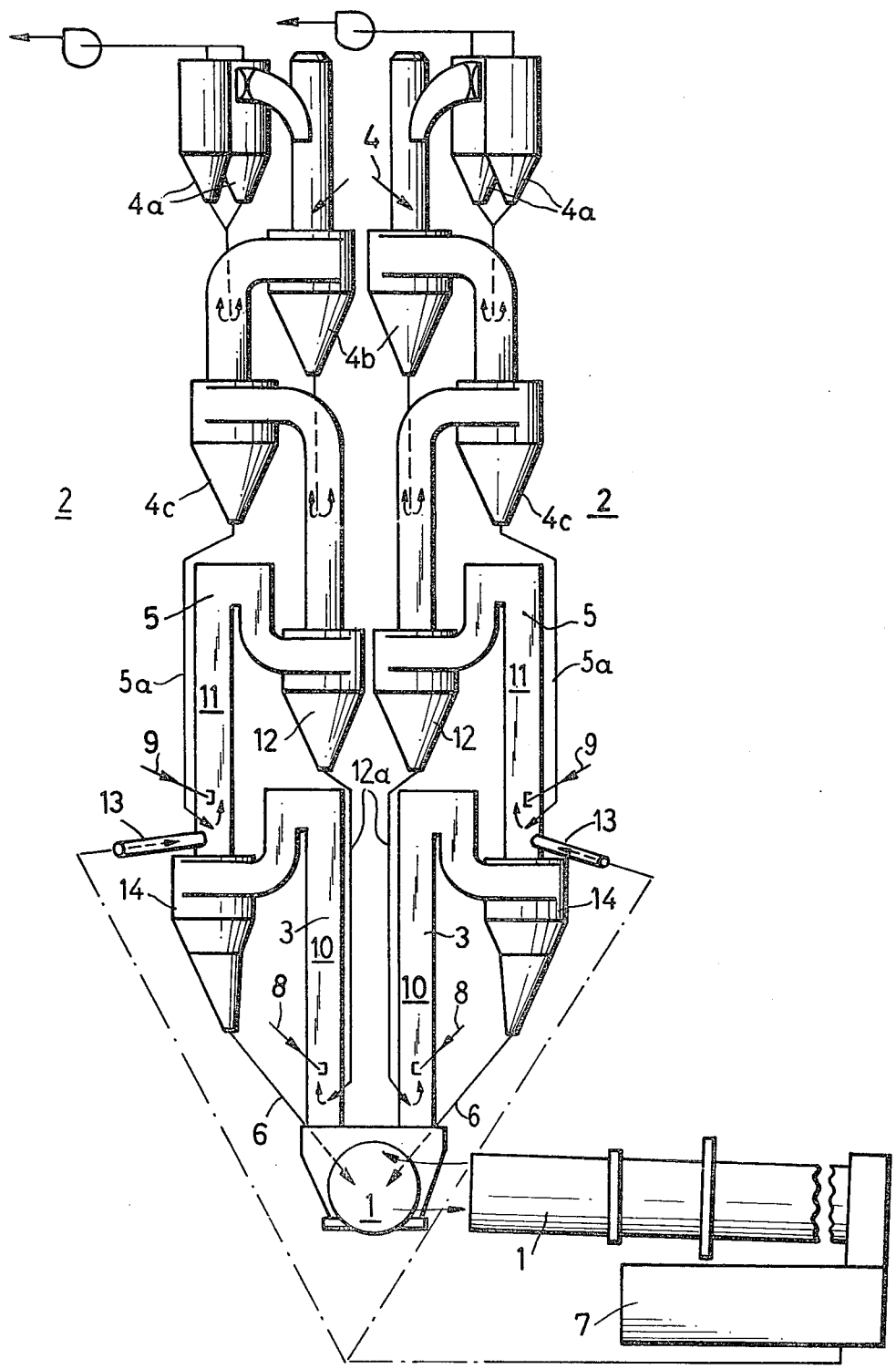

METHOD AND DEVICE FOR THE CALCINATION OF FINELY GRAINED TO DUST-FORM MATERIAL, PARTICULARLY OF COMMINUTED RAW MATERIAL TO BE USED IN THE MANUFACTURE OF CEMENT

This application is a continuation of application Ser. No. 234,422, filed Feb. 13, 1981, which was a continuation of application Ser. No. 115,251, filed Jan. 25, 1980, which was a continuation of application Ser. No. 911,698, filed June 1, 1978, all now abandoned.

BACKGROUND OF THE INVENTION

The invention relates to a method and mechanism for the calcination of fine grained pulverulent material, particularly which is comminuted raw material for the making of cement, wherein the material is thermally pretreated by hot gases in a preheating and precalcination operation before delivery to a sintering kiln and delivery of the clinker from the kiln to a cooler.

It has been known in the manufacture of cement to provide an additional calcination device in the gas conduit between a sintering furnace, a preheating heat exchanger system and mechanism for the deacidification of the comminuted raw material for cement. With this deacidification, the rotary kiln completes the heat treating operation which is principally that of clinker formation, that is the calcination of the material to completion. By deacidification in a precalcination device, the rotary kiln has thermal relief so that increased efficiency and an increase in output of the entire calcination installation are possible, and the dimensions of the structure and particularly of the rotary kiln can be reduced.

With newly developed manufacturing installations, very large output yields on the order of 3,000 tons per day of clinker or even more are possible with the arrangement of precalcination structures between the rotary sintering kiln and the heat exchanger system. In these constructions, appreciable difficulties are encountered in carrying out in an optimal manner the additional precalcination operations in the heat exchanger, and difficulties are encountered in controlling the load conditions to attain the desired calcination of the charging material without over-calcining in the precalcining process. The deacidification of a particle of lime is dependent substantially on three variables, the deacidification temperature, the duration time of the particles in the hot gas treatment stream and the grain size of the particle.

The grain size and grain distribution of the comminuted raw material are subject to technical limits. The production of a single grain comminuted material is at the present time not possible. An improvement of the deacidification conditions of the comminuted raw material by means of a change of this variable has previously led to no improved results.

The duration of time of the particles in the calcination step of a suspension gas heat exchanger system may be stretched out to a period of no longer than several seconds. The coarse grain fraction of the comminuted material, at temperatures of 850° to 900° C. requires deacidification periods which are appreciably higher. It has been suggested for the prolongation of the duration time to undertake a recirculation of a portion of the fine comminuted raw material to be deacidified. There is known from the German Laid-Open Specification No. 22 47 172, an installation for the manufacture of cement with a suspension gas heat exchanger including several cyclone steps arranged superimposed, with a rotary kiln, as well as an additional calcination chamber, in which in the material discharge conduit of the hottest cyclone, a correction or setting member is arranged through which a partial quantity of the material already calcined to a substantial extent is supplied to the additional calcination chamber. This is heated with combustion gases and additional fuel in which the fine grained material is to be calcined. In addition to the increase in cost for apparatus which is unfavorable to this installation, a uniformly calcined comminuted material before the sintering in the rotary kiln cannot be attained. The distribution of the comminuted raw material in accordance with the partial quantities required results in a part of the already deacidified material passing several times through the calcination chamber, and with a high degree of probability, a portion is over-calcined while another portion is only incompletely calcined and so arrives at the rotary kiln. Another problem is that the molten phase is reached and adhesions are caused on the gas and material guiding installation parts which are heated to the highest temperature, and these adhesions substantially impair the furnace operation. Also, deacidification heat must be applied in the furnace itself, and its production costs are unfavorably affected.

In accordance with another cement production method as shown in German Patent No. 23 44 583, there is arranged a calcination shaft between a rotary kiln and a heat exchanger of the suspension type. This shaft includes a lower combustion chamber with a separate fuel feed, a narrowed shaft part and an upper combustion chamber, whereby an additional fuel feed is arranged in the upper chamber above the shaft constriction. In the central part of the shaft, the arrangement contemplates a vigorously swirling layer of material so that a longer period of dwell of the material required for the calcination reaction is to be attained. It is not possible, however, to adjust the individual streams of gas in the treatment shaft to one another so that they can be referred to the particular granulation compositions of the material and cannot be arranged to attain the period of dwell required in each case for calcination. This results in partially over-burned and partially under-burned material.

In the German Laid-Open Specification No. 23 61 427, there is provided a specially constructed calcination chamber for the calcination of comminuted raw material for cement between a suspension gas heat exchanger and a rotary kiln. The calcination chamber provides for gas material suspension during formation of turbulent streams and is to be held for an extended period of dwell in the hot gas combustion gases in order to obtain a complete calcination. Such construction has the disadvantage of additional costs for the calcination chamber and the periods of dwell of the material cannot be adjusted, so the danger exists of over calcination of the material.

In order to influence the deacidification temperature, in another known method of German Laid-Open Specification No. 23 24 519, a comminuted raw material is to be calcined in a furnace exhaust conduit leading from the rotary kiln to the hottest zone of the preheater by means of additionally supplied fuel. This fuel is added to the material before entry into the exhaust gas conduit in finely divided form. This has the disadvantage that particularly with large cement manufacturing installations with high output that, a structure of appreciable dimensions must be provided. With such structure, a uniform heat transfer of fuel to the particles of comminuted raw material cannot be attained on account of the different concentration of the comminuted raw material and the exhaust gases. Additionally, the operation must be conducted with an appreciable excess of fuel because of the requirements for stabilization of the calcination so that maximal temperatures predetermined by the material can be uncontrollably exceeded. The fusible pulverulent material passes through the calcination and commences grain coarsening and commences formation of the molten phase. In this undesirable condition, the flow of the calcined material out of the hottest step of the preheater into the rotary kiln can create difficulty.

It is an object of the present invention to provide solutions to the foregoing and other disadvantages of the prior art and to provide a method and mechanism in which materials having a size from fine grain to dust can be calcined as uniformly as possble and be completely calcined in the precalcination zone of a heat exchanger system, even with very large output yields.

It is a further object of the invention to provide additional combustion zones for the precalcination operation which can be included in new systems or may be readily adapted in the area of presently existing heat exchanger systems so that constructions may be new or revised without requiring extensive capital and installation parts previously used or previously designed can be used in their present construction and size.

In accordance with the principles of the present invention, the inventive heat treatment step includes at least two reaction zones. The material to be treated is preheated and is passed through first and second reaction zones and the hot gases are separated from the material after each of the reaction zones and before the material is passed onto the subsequent location where it is treated. In this manner, a long period of dwell of the material in the temperature range required for the calcination is attained. In the particular reaction section, only as much fuel is added to the material as may be optimally mixed with the material reliably in the section for optimum calcination. During the separation of the gas and material, an intensive mixing of the material and an equalization of the material temperature takes place. This material then upon entry into the next following reaction section has a unitary temperature level and a uniform degree of calcination. The following reaction zone, therefore, requires only as much residual quantity of fuel to be supplied to it and converted to heat as required for the complete calcination, that is, for the attainment of a predetermined degree of calcination. In this manner, with optimal utilization of fuel, optimum and determinable prolongation of the time required for the calcination reaction is attained. Thereby, an overcalcination of the material particles is prevented. Also prevented are other disturbances such as caking in the heat exchanger system. This attains an improvement in the overall effectiveness and efficiency of the furnace as a unit.

In a further feature of the invention, fuels of different heat contents are supplied to the separate reaction zones. At least one of these will be a high grade fuel. This attains a good adaptation to the different fuel qualities. It has been found that primary energy is not always available with the required high heating values, and further that different factors require utilization of fuel of lesser quality.

A further feature of the invention provides for the use of a fuel containing component or a solid fuel, and such fuel is supplied in the first reaction zone. This provides an advantage that when a fuel portion of the material which has a fuel containing component has a low ignition temperature and during the combustion in an oxygen rich stream of hot gas, it can give off its heat through the non-combustible material components and the treatment material.

In a preferred arrangement, the first reaction zone has a temperature range such that the easily volatile constituents of the fuel containing material/or the solid fuel burn out completely whereas the constituents which volatilize with difficulty and the solid constituents will burn out only partially. Thus, the still unburned solid fuel constituents then are included with the stream of comminuted raw material and separated out from the gases and passed into the second reaction zone. In the second reaction zone, a separate fuel is added such as gas or oil and a higher combustion temperature occurs. The solid fuel constituents which were not burned out in the first reaction zone are intensively mixed with the material and some may be additionally burned out during the separation which occurs between the first and second reaction zone, but the solid fuels will additionally complete their combustion in the second reaction zone where they are fired with the gas or oil, and thus, an optimal calcination treatment results. It is possible even with high output yields and with a high material to gas relation to achieve an optimal accumulation or mixture between the fuel particles and the material particles and to attain improved heat transfer required for the calcination.

In accordance with a feature of the invention, the second reaction zone is supplied directly with an oxygen containing gas, such as from the sintering step. Thus, the sintering step exhaust gases which still contain oxygen are utilized for the calcination with the additionally supplied fuels in this reaction zone. It is for this reason that the first reaction zone is connected in series with separately supplied combustion air. By the division of the reaction steps of calcination into two reaction zones, the first reaction zone provides an almost complete calcination treatment of the material through combustion of a lower grade fuel in an oxygen rich atmosphere while in the next following reaction zone, the remaining calcination is carried out by means of a higher grade fuel in the furnace exhaust atmosphere enriched with oxygen and some mineral clinker formation may already be produced at that step. It is possible that even with the greatest output yields, the calcination step of the process may be essentially completed so that the mechanical installation of the kiln may be held optimally small. It is also suitable that the combustion air supplied in the first reaction zone is hot exhaust air from the cooling step which provides a good thermal efficency for the entire installation.

The invention relates to a device for the thermal treatment of pulverulent material which ranges from fine grain to dust size with hot gases, particularly for the calcination of cement including a suspension gas heat exchanger which is arranged to be connected in series with a rotary kiln and a grate cooler and has two partial calcination sections for the precalcination of the material which are connected consecutively and each partial calcination section has a separate fuel feed. The advantages of this arrangement include that without additional expenditure for substantial structure, the period of dwell of the treatment material is appreciably prolonged so that even in cement installations of high output yields, sufficient period of dwell in a hot gas atmosphere is available without exceeding the limit of temperatures for the material. The invention provides that between partial calcination sections of a suspension gas heat exchanger of the cylone type, an insertion structure may be provided for conveyance of the material into partial calcination sections connected in series so that an intensive mixture of at least partially calcined material may take place before proceeding into the next following reaction section.

It is a further feature of the device that partial calcination sections are provided connected in series with the first section being provided with a separate combustion air supply, preferably in the form of an air conduit leading from the clinker cooler exhaust air. This provides the lowest technical or structural installation expenditure so that by means of the supply of a high grade fuel into an oxygen rich combustion atmosphere, the material may be calcined up to 90% to 95% almost completely. In the second section connected in series by the supply of a correspondingly measured residual quantity of fuel, the calcination treatment of the material may be carried out to 100%, and if desired, mineral clinker formation of the $C_2S$ phase may be introduced. The two step calcination combustion section is then completely integrated into a suspension gas heat exchanger, and it is possible to set up a cement production installation with a so-called short kiln even for the largest output yield so that investment costs are lowered, and the total economy of the cement manufacturing installation is improved.

Other objects, advantages and features, as well as equivalent structures and methods which are intended to be covered herein, will be more apparent from the teaching of the principles of the present invention in connection with the disclosure of the specification, claims and drawings, in which:

DRAWINGS

The single Figure of the drawings is a schematic elevational view of a heat exchanger for the treatment of raw material to be converted into cement constructed and operating in accordance with the principles of the present invention.

DESCRIPTION

The drawing shows a rotary kiln 1 receiving material from a calcining or precalcining heat exchanger system 2. The heat exchanger system 2 is divided into two parallel flow lines, each consisting of a plurality of separating heat exchange cyclones connected consecutively, which operate in accordance with principles heretofore known in a precalciner for a cement system and which need not be described in detail. Two separate heat exchange lines 2 connect at their lower ends with their final discharges through lines 6 to the intake end of the rotary kiln 1.

The original raw material charging takes place through a line 4 by a charging device which is not shown in detail. The raw material passes down through the preheating cyclones 4a, 4b and 4c. These cyclones are provided with gas from the system for preheating the material, and the material discharge from the cyclone 4c passes down through the line 5a into the base of a vertical conduit 5. Within this vertical conduit 5 is a first reaction zone 11.

The material and gas flows upwardly through the first reaction zone 11 and is separated in a heat exchange cyclone 12 whereupon the material flows down through the lines 12a into the base of vertical conduits 3 which contain a second reaction zone 10. The material then flows upwardly and into final cyclone separators 14 and downwardly through their discharge lines 6 to pass into the rotary kiln and the material then passes into a material cooler 7.

Each of the parallel sides of the heat exchanger system 2 has a first and second reaction zone 11 and 10 which are connected in series consecutively. Each of the first and second reaction zones has separate fuel supplies 9 and 8 respectively. The first and second reaction zones, which also may be termed partial calcination sections, are separated from each other by the cyclone 12 which functions to separate the material from the hot gases and cause intimate mixing therebetween between the reaction zone 11 and the reaction zone 10. The second calcination section or reaction zone 10 is arranged in the vertical conduit 3 which leads upwardly and discharges into the cyclone 14. The first reaction zone 11 is provided with a separate air supply conduit 13 which is supplied from the clinker cooler 7.

In the cement calcination installation illustrated, the comminuted raw material for cement which is charged at 4 is guided against the direction of flow of the rotary kiln exhaust gases and passes through the separator cyclones in the system 2 in a downward direction and the material is treated stepwise and reaches a first partial calcination section 11 which is provided in the vertical conduit 5. In the first reaction zone, fuel is added at 9 such as in the form of oil sprayed into the lower end of the column 5. Calcining occurs as the material flows upwardly carried by the hot gases and flows into the cyclone 12 wherein the comminuted material is separated from the hot gases and flows down through line 12a into the second reaction zone 10. In the second reaction zone, the comminuted material is completely calcined and fuel is added through a fuel supply line 8. The fuel may be oil or other high grade fuel. Calcination may be completed or the process may be carried beyond the calcination so that clinker minerals may also be formed in the second reaction zone 10. The material flows upwardly through the conduit 3 and is separated from the hot gases in the lowermost cyclone 14, and the material flows down through the line 6 to be introduced into the entry end of the rotary kiln 1 for the further formation of clinker mineral and sinter. After termination of the clinker formation, it is cooled in the material cooler 7 for further processing.

Particularly in cases where high grade fuels are available in limited degrees or where their expense creates a limitation, fuels with different heat contents may be supplied to the partial calcination zones 10 and 11. It is possible after measuring predetermined quantities of fuel supplied to each reaction zone, to introduce completely calcined comminuted raw materials into the rotary kiln 1. For example, the partial calcination section 11 may be provided with a fuel supply of a material which is a fuel containing material and which gives off its heat to the heating a calcination of the noncombustible material component of the fuel and also for the calcination of the raw material. The temperature of the calcination reaction in the first reaction zone 11 may be so adjusted by control of the type and flow of fuel relative to the material being calcined so that the gaseous constituents of the fuel of the material are completely burned while the solid carbons of this fuel portion burn only to a small degree. These solid portions are intensively mixed with the noncombustible material in the separator cyclone 12 and are conveyed together to the second reaction zone 10. In the second reaction zone 10, a high grade gaseous or liquid fuel such as oil is supplied so that the reaction zone 10 is operated at a higher temperature and the solid fuel constituents, which were introduced at 9, and which are not yet burned out, will finally burn out and give off their heat in the second reaction zone 10. During the process of their giving off their heat, complete calcination of the raw material occurs.

A further adaptation of the invention is to provide for the introduction of a fuel containing component with a very high ignition temperature into the second reaction zone 10. The portion of the fuel which has the high ignition temperature and which is ignitable with difficulty is gasified and burnt in the presence of the hit furnace exhaust gases which flow upwardly from the kiln 10 and this component gives off its heat energy for the remaining deacidification of the comminuted material. The choice of fuels to introduce at 8 and 9 may be made in accordance with economic factors, but also in accordance with conditions which exist in accordance with the guidelines set forth above. It is also possible by the consideration of the type of fuel introduced to control the amount of calcination in each of the first and second reaction zones 11 and 10, and improve the quality of the resultant product.

It is also possible to provide the second reaction zone with air, as may be desirable in accordance with the fuel used at 8, and such air could be supplied with a second split-off conduit leading from the material cooler 7.

Thus, it will be seen that we have provided an improvement and apparatus which meets the objectives above set forth and attains improved control and an improved product for higher outputs and higher efficiency.

We claim as our invention:

1. The method of heat treating a comminuted raw material for cement including the steps of:
   preheating the entire raw material;
   passing the preheated material entirely to a first reaction zone;
   supplying a first fuel which is a solid fuel to said first reaction zone for a partial calcining reaction in the first reaction zone;
   separating the partly calcined material from the hot gases after treatment of said material in the first reaction zone;
   successively passing all of the separated material to a second reaction zone remote from said first reaction zone;
   supplying a second fuel to said second reaction zone separately from the supply of first fuel for said first reaction zone for supplying thermal energy for carrying out an additional calcination reaction in said second reaction zone for completing calcination of all said material, said first and second fuels having different heat contents and at least one of said first and second fuels being a high-grade fuel;
   maintaining the temperature in said first reaction zone in a range for completely burning the volatile constituents of said first fuel in said first zone;
   passing any unburnt solid portion of said first fuel in combination with said material to said second reaction zone;
   separating the material from the hot gases of the second reaction zone after treatment therein; and
   thereafter passing the completely calcined material to a sintering kiln remote from said first and second reaction zones, and passing hot exhaust gases in series through said second reaction zone and through said first reaction zone.

2. The method of heat treating a comminuted raw material for cement including the steps of claim 1:
   wherein the fuel supplied to the second zone has a high ignition temperature.

3. The method of heat treating a comminuted raw material for cement including the steps of claim 1:
   wherein at least one of the reaction zones is supplied with oxygen containing gases.

4. The method of heat treating a comminuted raw material for cement including the steps of claim 1:
   wherein the first reaction zone is supplied with combustion air.

5. The method of heat treating a comminuted raw material for cement including the steps of claim 4 and further including the step of:
   cooling the particles discharged from said sintering kiln and passing air from said cooling into said first reaction zone as combustion air.

6. A mechanism for heat treating a comminuted raw material for cement comprising in combination:
   a preheating means for preheating all of the raw material; means defining a first reaction zone connected to receive all of the preheated material;
   a first fuel supply connected to the first reaction zone for supplying a first fuel which is a solid fuel having a first heat content for supplying thermal energy for carrying out a first partial calcination reaction of all of the pre-heated material in the first reaction zone;
   a first separation means connected to the first reaction zone for separating the partly calcined material from the hot gases received from the first reaction zone;
   means defining a second reaction zone remote from said first reaction zone and connected to successively receive all of the separated material as well as any unburnt solid portion of said first fuel from the separation means;
   a second fuel supply connected to the second reaction zone for supplying a second fuel having a second heat content to said second reaction zone to supply thermal energy for carrying out a second calcination reaction for completing calcination of all of the partly calcined material in the second reaction zone;
   a second separation means connected to the second reaction zone for separating material from the hot gases;
   a sintering kiln remote from said first and second reaction zones and having an input connected for receiving all of the discharge of completely calcined material from said second reaction zone for sintering the completely calcined material and for producing hot exhaust gases; and
   means for passing hot exhaust gases from said kiln sequentially through said second reaction zone and then said first reaction zone.

7. A mechanism for heat treating a comminuted raw material for cement constructed in accordance with claim 6:

wherein said separation means connected to the first zone directs gases to the preheating means and directs raw material to the second reaction zone.

8. A mechanism for heat treating a comminuted raw material for cement constructed in accordance with claim 6:
wherein said first and said second separation means each include a cyclone separator.

9. A mechanism for heat treating a comminuted raw material for cement constructed in accordance with claim 6:
including a gas conduit leading from the sintering kiln to said separation means for the second zone wherein said second reaction zone is located in said conduit.

10. A mechanism for heat treating a comminuted raw material for cement constructed in accordance with claim 6:
including a cooler connected to receive clinker from said rotary kiln with a cooler air exhaust duct leading from the cooler and connected to direct cooler air to said first reaction zone.

11. A mechanism for heat treating a comminuted raw material for cement constructed in accordance with claim 6:
wherein said second reaction zone is connected directly to said rotary kiln.

12. A method of heat treating a comminuted raw material for cement including the steps of claim 1:
including providing a pair of parallel paths for said material with each path providing said first and second reaction zones with the paths joining in advance of the sintering kiln.

13. A mechanism for heat treating a comminuted raw material for cement constructed in accordance with claim 6:
including a second structure having each of the elements of claim 9 with the separation means of said first and second structures joining in advance of the sintering kiln so that the discharge of both structures feeds to a single sintering kiln.

14. A mechanism for heat treating a comminuted raw material for cement constructed in accordance with claim 13:
wherein the second reaction zones are each connected at their upstream ends to the entry of the sintering kiln.

15. A mechanism for heat treating a comminuted raw material for cement constructed in accordance with claim 6:
wherein each of said reaction zones is formed within a vertically extending conduit.

16. The method of heat treating a comminuted raw material for cement including the steps of claim 1:
wherein the material is calcined in said first reaction zone in the range of 90% to 95% and is calcined in the second reaction zone to at least 100%.

* * * * *